United States Patent
Kim

(10) Patent No.: US 6,172,719 B1
(45) Date of Patent: Jan. 9, 2001

(54) AUTOMATIC COLOR TEMPERATURE CONTROL DEVICE FOR VIDEO APPLIANCE

(75) Inventor: Jae Man Kim, Kyoungsangbuk-Do (KR)

(73) Assignee: LG Electronics, Inc., Seoul (KR)

(*) Notice: Under 35 U.S.C. 154(b), the term of this patent shall be extended for 0 days.

(21) Appl. No.: 08/998,456

(22) Filed: Dec. 24, 1997

(30) Foreign Application Priority Data

Dec. 24, 1996 (KR) .................................................. 96-71303

(51) Int. Cl.[7] ...................................................... H04N 9/73
(52) U.S. Cl. ............................ 348/655; 348/603; 348/553
(58) Field of Search ..................................... 348/603, 564, 348/223, 553, 649, 655, 656, 569

(56) References Cited

U.S. PATENT DOCUMENTS

| | | | |
|---|---|---|---|
| 4,742,387 | * | 5/1988 | Oshima ................................. 348/603 |
| 5,083,195 | * | 1/1992 | Evelin .................................. 348/603 |
| 5,481,302 | * | 1/1996 | Yamamoto et al. ................. 348/223 |
| 5,488,434 | * | 1/1996 | Jung .................................... 348/603 |
| 5,757,438 | * | 5/1998 | Yoon et al. .......................... 348/603 |
| 5,822,012 | * | 10/1998 | Jeon et al. ........................... 348/553 |

\* cited by examiner

Primary Examiner—Victor R. Kostak

(57) ABSTRACT

An automatic color temperature control device for a video appliance is disclosed which can control the color temperature of a picture displayed on a screen so as to give the viewer the impression of being coolly refreshed when the environmental temperature is high, and the impression of being warmed when the environmental temperature is low. The device includes a chromaticity sensing section for sensing environmental brightness and color of the appliance, a temperature sensing section for sensing an environmental temperature of the appliance, a processing section for recognizing the environmental brightness, color, and temperature in accordance with sensed signals outputted from the chromaticity sensing section and the temperature sensing section, and outputting control signals for controlling a picture state of the appliance in response to the recognized environmental brightness, color, and temperature, and a video processor for controlling contrast, brightness, and color of a displayed picture in accordance with the control signals outputted from the processing section.

10 Claims, 5 Drawing Sheets

AUTOMATIC COLOR TEMPERATURE CONTROL DEVICE FOR VIDEO APPLIANCE

TECHNICAL FIELD

The present invention relates to an automatic color temperature control device for a video appliance, and more particularly to an automatic color temperature control device for a video appliance utilizing a temperature sensor, which can lower the color temperature of a picture displayed on a screen to provide a cool feeling to a viewer when the environmental temperature of the appliance is high, and which can heighten the color temperature of the picture to provide a warm feeling to the viewer when the environmental temperature is low.

BACKGROUND OF THE INVENTION

The human eye's sensation of a color picture varies in accordance with the color temperature of the color picture displayed on the screen of the video appliance such as a television receiver. For instance, the blue color group which gives the cool feeling to the viewer has a low color temperature, and the red color group which gives the warm feeling to the viewer has a high color temperature. The color temperature as described above is one of important color control parameters for providing an optimum picture to the viewer eye's sensation.

There is disclosed an automatic color control device for a television receiver which senses the brightness and color of the exterior environment of the television receiver and determines the optimum picture display condition whereby a viewer does not feel eye strain in accordance with the sensed brightness and color of the environment.

The conventional color control device for a television receiver, as shown in FIG. 1, includes a chromaticity sensing section 11 for sensing the environmental brightness and the environmental color of the television receiver, converting the sensed signals into corresponding voltage values, and amplifying the voltage values, a microprocessor 12 for recognizing the current information on the environmental brightness and color in accordance with the voltages outputted from the chromaticity sensing section 11 and outputting control signals in response to the recognized information, and a video processor 10 for controlling the brightness and color of a displayed picture in accordance with the control signals outputted from the microprocessor 12 to provide the picture optimum to the viewer eye's sensation.

The video processor 10 comprises a decoder and digital-to-analog (D/A) converter 13 for outputting a contrast control signal, brightness control signal, and color control signal in accordance with the control signals from the microprocessor 12, a contrast control section 14 for controlling the amplitude of input primary color signals of R(red), G(green), B(blue) in accordance with the contrast control signal outputted from the decoder 13, a brightness control section 15 for controlling the brightness of the picture by controlling the DC bias voltage of the RGB primary color signals amplitude-controlled by the contrast control section 14 in accordance with the brightness control signal outputted from the decoder 13, a white point control section 16 for properly controlling respective levels of the RGB primary color signals outputted from the brightness control section 15 in accordance with the color control signal outputted from the decoder 13, and an output buffer section 17 for buffering the RGB primary color signals outputted through the white point control section 16 to output the buffered primary color signals to a cathode ray tube (CRT) driving circuit (not illustrated).

The operation of the conventional color control device as constructed above will now be explained.

A luminance sensor Cy in the chromaticity sensing section 11 senses the brightness of the environment of the television receiver, and a color sensor Ye senses the color of the environment.

At this time, the resistance of the luminance sensor Cy varies in proportion to the environmental brightness, and the resistance of the color sensor Ye varies in proportion to the environmental color. For instance, if the environmental color contains an intensified blue color, the resistance of the color sensor Ye is lowered, while the environmental color contains an intensified red color, the resistance of the color sensor Ye is heightened.

The output voltages, i.e., the sensed signals of the luminance sensor Cy and the color sensor Ye are inputted to non-inverting terminals (+) of operational amplifiers OP1 and OP2, and reference voltages are inputted to inverting terminals (−) thereof, respectively.

The operational amplifiers OP1 and OP2 amplify the differences between the sensed signals and the reference voltages, respectively, and provide their outputs to the microprocessor 12.

The microprocessor 12 recognizes the information on the environmental brightness and color of the appliance according to the output voltage values of the chromaticity sensing section 11, and outputs control signals to the video processor 10 through a serial data line SDL and a serial color line SCL, so that the brightness of the picture is relatively heightened if the external environment of the appliance is bright, while the brightness of the picture is relatively lowered if the external environment is dark.

Such a brightness control prevents eye strain caused by the phenomenon that the human's eye senses the picture as being relatively too dark or too bright when the external environment of the appliance is bright or dark, respectively.

The decoder and D/A converter 13 in the video processor 10 decodes and analyzes the control signals inputted from the microprocessor 12, and quantifies the analyzed control signals through D/A conversion to output control data for controlling the respective circuit blocks of the video processor 10.

The contrast control section 14 controls the amplitude of the input RGB primary color signals in accordance with the contrast control signal outputted from the decoder and D/A converter 13, and the brightness control section 15 controls the brightness of the picture to be displayed by controlling the DC bias voltage level of the amplitude-controlled RGB primary color signals in accordance with the brightness control signal outputted from the decoder and D/A converter 13 to output the brightness-controlled RGB primary color signals to the white point control section 16.

The white point control section 16 controls the respective levels of the RGB primary color signals outputted from the brightness control section 15 in accordance with the color control signal outputted from the decoder and D/A converter 13 to control the color of the entire picture. The RGB primary color signals outputted from the white point control section 16 is inputted to the CRT driving circuit through the output buffer section 17.

By the above-described control operation, the brightness of the picture is increased when the external environment is relatively bright, while the brightness of the picture is decreased when the external environment is relatively dark, thereby reducing the fatigue of the viewer's eye.

Meanwhile, if the blue color is intensified in the external environment, the color temperature of the picture is controlled to be lowered so that the blue color is intensified in the displayed picture, while if the red color is intensified in the external environment, the color temperature of the picture is controlled to be heightened so that the red color is intensified in the displayed picture.

As a result, according to the conventional color control device, the contrast, brightness, and color of the picture to be displayed on the screen are continuously controlled in accordance with the brightness and color of the external environment of the television receiver sensed by the luminance sensor and color sensor, thereby providing the picture optimum to the viewer eye's sensation.

However, according to the conventional color control device, the picture display condition is determined only by detecting the brightness and color of the external environment, but the picture atmosphere which the viewer feels differently in accordance with the environmental temperature of the appliance is not considered. Specifically, if the color temperature of the picture is low and thus the picture atmosphere becomes cold when the environmental temperature is low, the viewer will feel the cold more severely from the displayed picture. Also, if the color temperature of the picture is high and thus the picture atmosphere becomes hot when the environmental temperature is high, the viewer will feel the heat more severely from the displayed picture. The color control operation without considering the environmental temperature may give the viewer an unpleasant feeling or irritate the viewer.

SUMMARY OF THE INVENTION

It is an object of the present invention to solve the problems involved in the related art, and to provide an automatic color temperature control device for a video appliance which can automatically control the color temperature of a picture displayed on a screen so that a refresh feeling is given from the displayed picture when the environmental temperature of the appliance is high, while a warm feeling is given from the displayed picture when the environmental temperature is low.

It is another object of the present invention to provide an automatic color temperature control device for a video appliance which can display the environmental temperature detected during the color temperature control operation on a screen of the appliance.

In order to achieve the above objects, there is provided an automatic color temperature control device for a video appliance, comprising:

a chromaticity sensing section for sensing environmental brightness and color of the appliance;

a temperature sensing section for sensing an environmental temperature of the appliance;

a processing section for recognizing the environmental brightness, color, and temperature in accordance with sensed signals outputted from the chromaticity sensing section and the temperature sensing section, and outputting control signals for controlling a picture state of the appliance in response to the recognized environmental brightness, color, and temperature; and a video processor for controlling contrast, brightness, and color of a displayed picture in accordance with the control signals outputted from the processing section.

BRIEF DESCRIPTION OF THE DRAWINGS

The above objects, other features and advantages of the present invention will become more apparent by describing the preferred embodiment thereof with reference to the accompanying drawings, in which.

DETAILED DESCRIPTION OF THE PREFERRED EMBODIMENT

Figure 1:
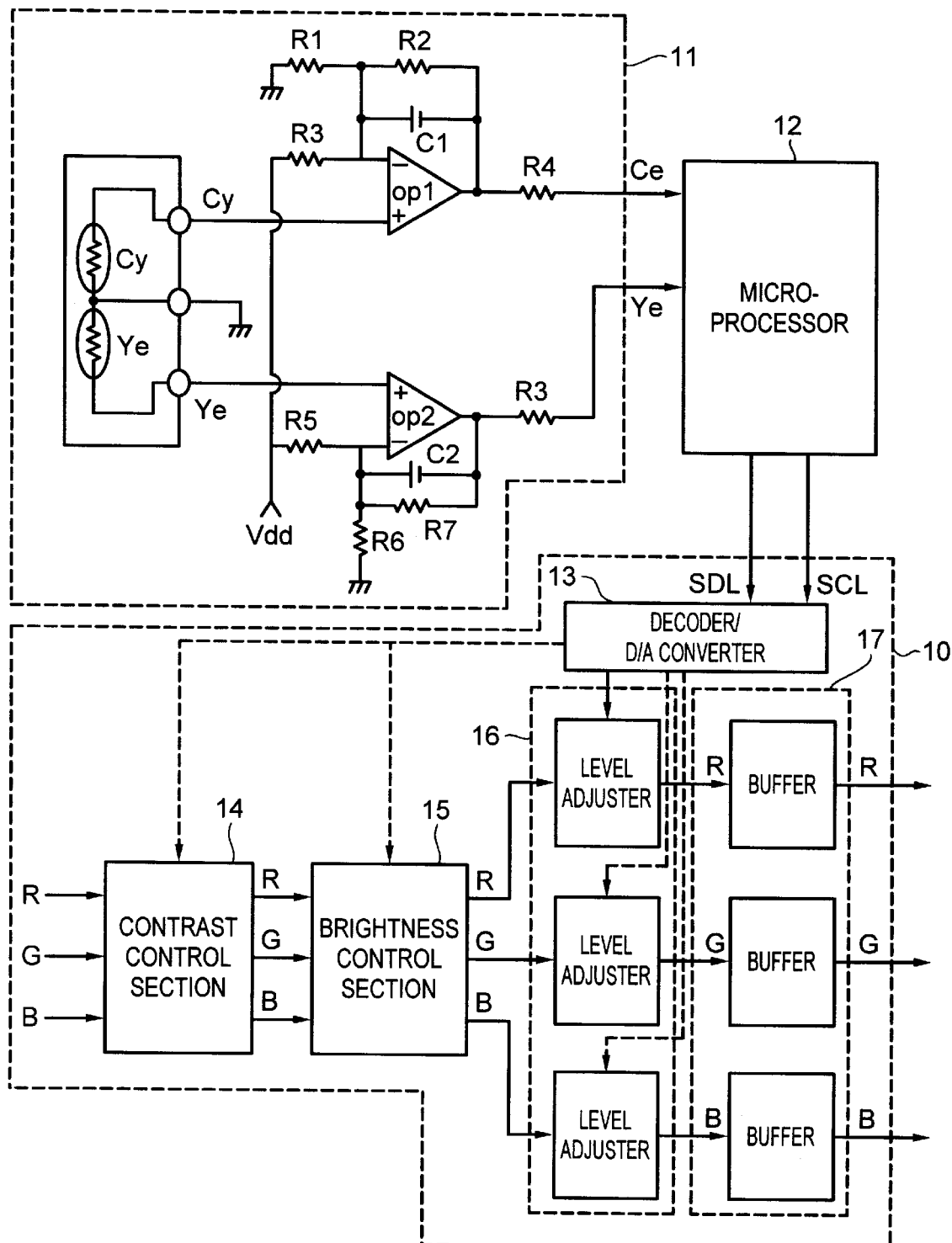
FIG. 1 is a block diagram of a conventional color control device for a television receiver.
Figure 2:
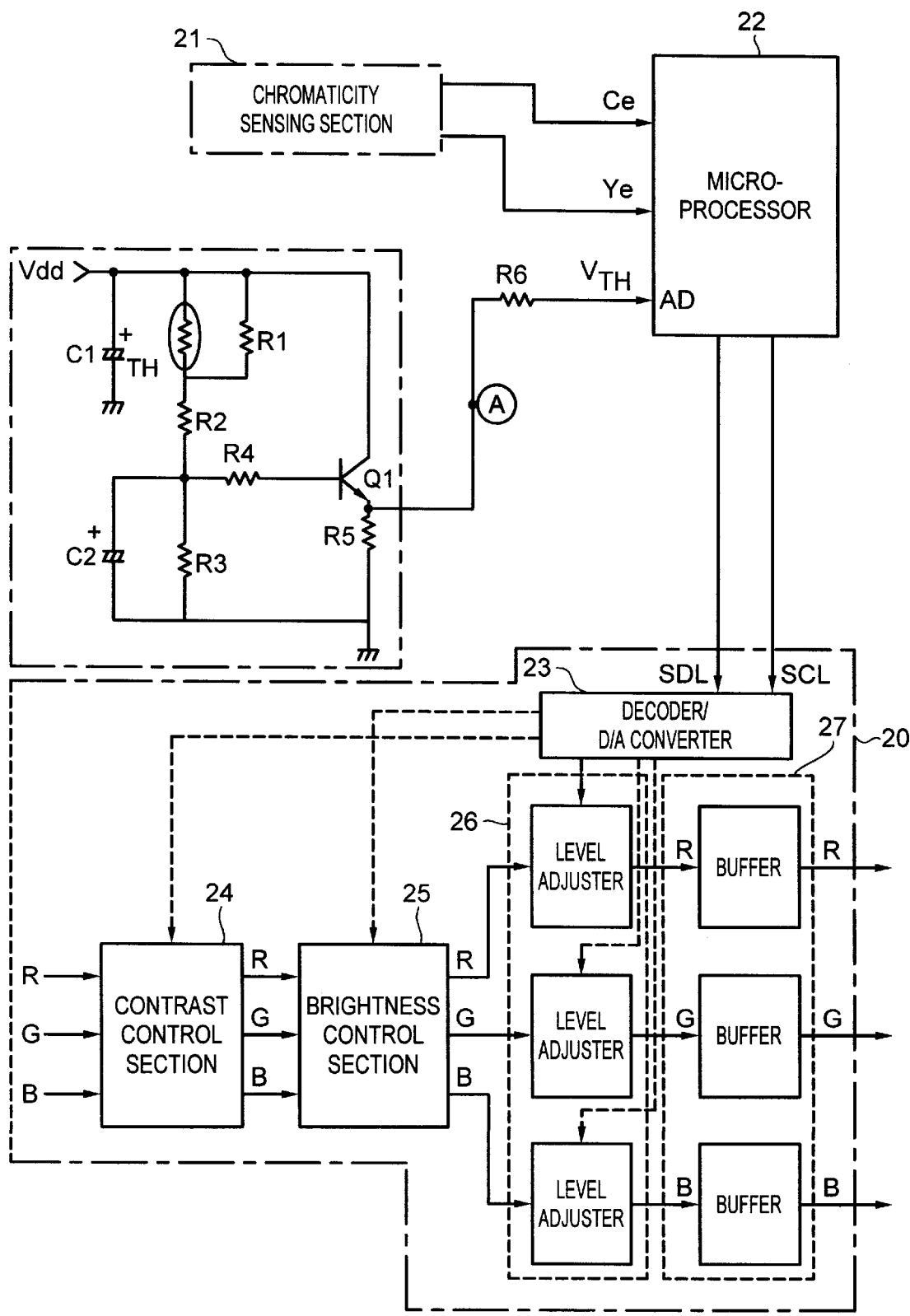
FIG. 2 is a block diagram of an automatic color temperature control device for a video appliance according to the present invention.

FIG. 2 is a block diagram of the automatic color temperature control device for a video appliance according to the present invention.

Referring to FIG. 2, the automatic color temperature control device according to the present invention includes a chromaticity sensing section 21 for sensing environmental brightness and color of the appliance, a temperature sensing section 28 for sensing an environmental temperature of the appliance, a microprocessor 22 for recognizing the environmental brightness, color, and temperature in accordance with sensed signals outputted from the chromaticity sensing section 21 and the temperature sensing section 28, and outputting control signals for controlling a picture state of the appliance in response to the recognized environmental brightness, color, and temperature, and a video processor 20 for controlling the contrast, brightness, and color of a displayed picture in accordance with the control signals outputted from the microprocessor 22.

The construction of a contrast control section 24, brightness control section 25, white point control section 26, and output buffer section 27 in the video processor 20 can be identical to that in the conventional color control device.

The operation of the automatic color temperature control device according to the present invention will now be explained.

A luminance sensor and a color sensor in the chromaticity sensing section 21 senses the environmental brightness and color of the appliance, respectively, and converts the sensed signals into corresponding voltages to output the converted voltages to the microprocessor 22.

Figure 3:
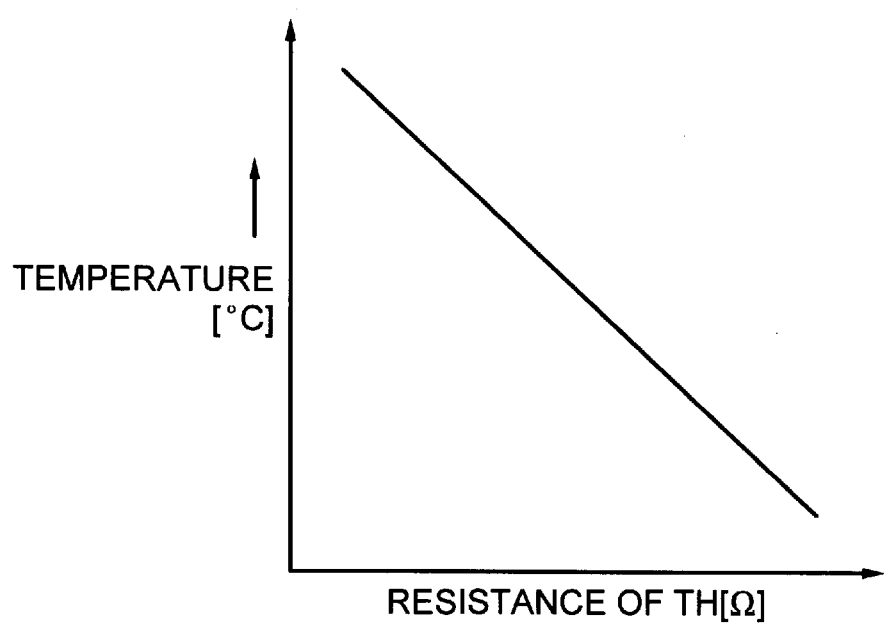
FIG. 3 is a graph illustrating the resistance variation characteristic of the thermistor in FIG. 2 with respect to the environmental temperature.

At the same time, the temperature sensing section 28 senses the environmental temperature of the appliance utilizing, e.g., a thermistor TH. As shown in FIG. 3, the resistance value of the thermistor TH is decreased as the environmental temperature is heightened, while the resistance value of the thermistor TH is increased as the environmental temperature is lowered.

If the resistance value of the thermistor TH is decreased, the base voltage which is applied to the base of a transistor Q1 through the internal resistor of the thermistor TH and resistors R to R4 becomes heightened, and thus the transistor Q1 is turned on to heighten its emitter voltage.

On the other hand, if the environmental temperature is low, the resistance value of the thermistor TH is increased to lower the base voltage of the transistor Q1. Accordingly, the transistor Q1 is turned off to lower its emitter voltage.

Figure 4:
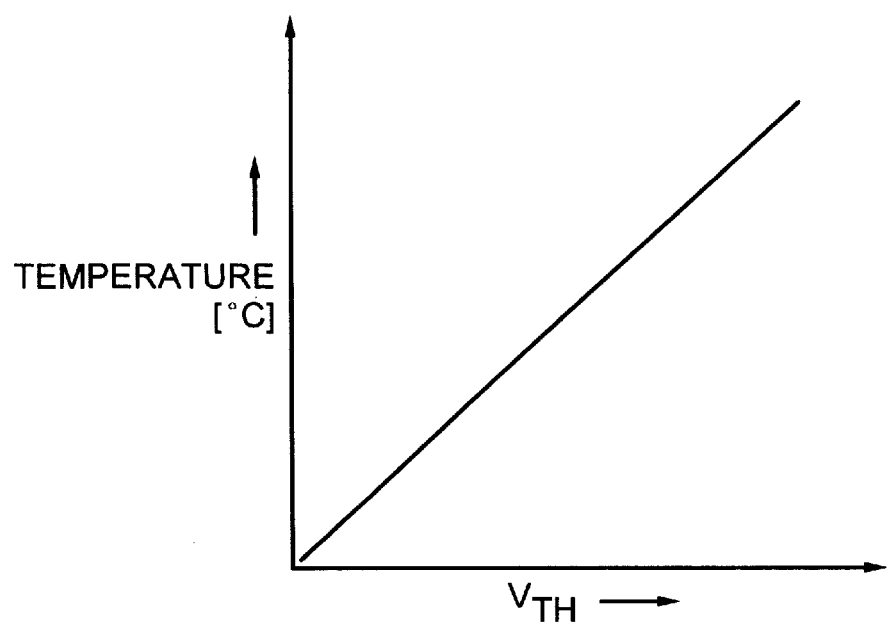
FIG. 4 is a graph illustrating the emitter voltage characteristic of the transistor in FIG. 2 with respect to the temperature variation.

As a result, the emitter voltage $V_{TH}$ of the transistor Q1, as shown in FIG. 4, becomes lowered when the environmental temperature is low, but it becomes heightened when the environmental temperature is high.

The emitter voltage $V_{TH}$ of the transistor Q1 in the temperature sensing section 28 is outputted to an analog-to-digital conversion terminal AD of the microprocessor 22. The microprocessor 22 converts the emitter voltage $V_{TH}$ into digital data, and recognizes the environmental temperature of the appliance according to the digital data.

Specifically, in case that the microprocessor 22 recognizes the present environmental temperature to be hot, it outputs control signals for lowering the color temperature of the displayed picture, i.e., for intensifying the blue color in the picture, to the video processor 20 through the serial data line SDL and the serial clock line SCL, so that the white point control section 26 in the video processor 20 controls the color of the picture in such a manner that it weakens the red (R) color level and intensifies the blue (B) color level in the displayed picture.

In case that the microprocessor 22 recognizes the present environmental temperature to be cold, it outputs control signals for heightening the color temperature of the displayed picture, i.e., for intensifying the red color in the picture, to the video processor 20 through the serial data line SDL and the serial clock line SCL, so that the white point control section 26 in the video processor 20 control the color of the picture in such a manner that it weakens the blue (B) color level and intensifies the red (R) color level in the displayed picture.

In detail, the control signals outputted from the microprocessor 22 are inputted to the decoder and D/A converter 23 to be decoded and D/A-converted. The converted control data is provided to the respective circuit blocks in the video processor 20.

The contrast control section 24 controls the amplitude of the input RGB primary color signals in accordance with the contrast control signal outputted from the decoder and D/A converter 23, and the brightness control section 25 controls the brightness of the picture to be displayed by controlling the DC bias voltage level of the amplitude-controlled RGB primary color signals in accordance with the brightness control signal outputted from the decoder and D/A converter 23 to output the brightness-controlled RGB primary color signals to the white point control section 26.

Figure 5:
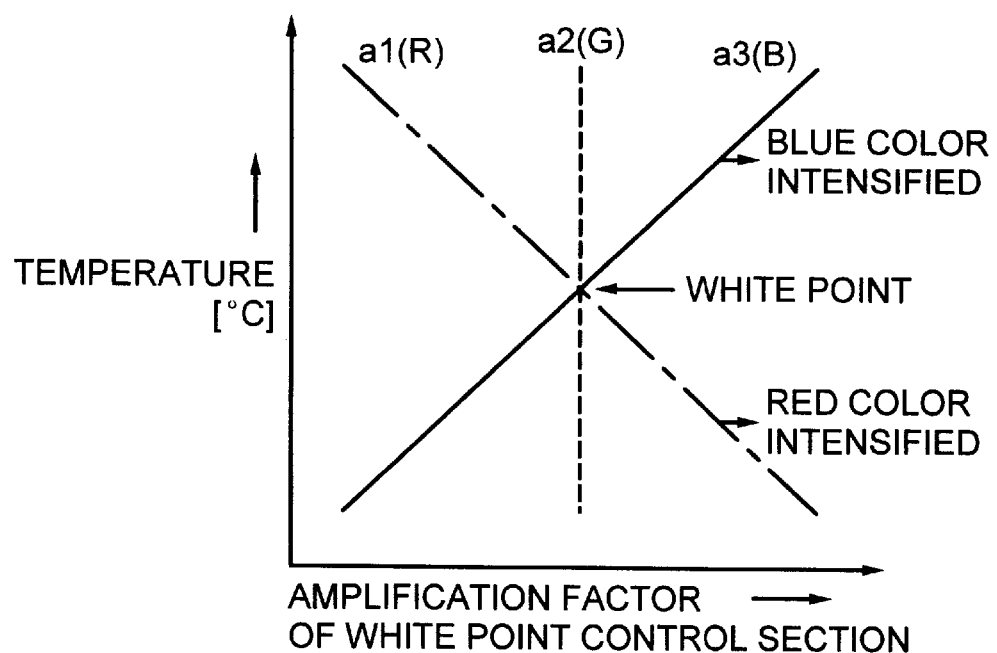
FIG. 5 is a graph illustrating the amplification factor variation characteristic of the white point control section in FIG. 2 with respect to the environmental temperature.
Figure 6:
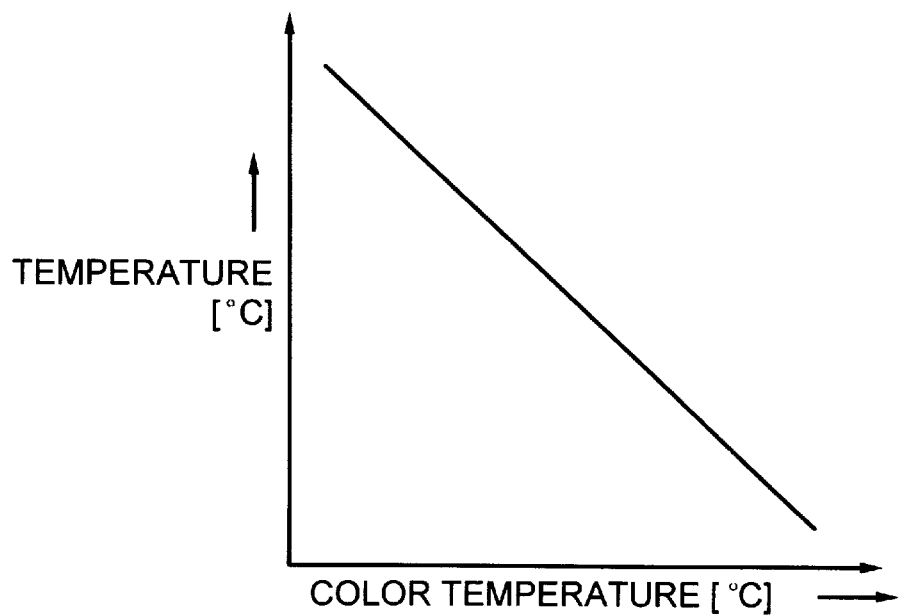
FIG. 6 is a graph illustrating the color temperature variation characteristic of the displayed picture with respect to the environmental temperature according to the present invention.

The white point control section 26, as shown in FIG. 5, controls the respective levels of the RGB primary color signals outputted from the brightness control section 25 in accordance with the variation of the environmental temperature, and outputs the level-controlled RGB color signals to the CRT driving circuit through the output buffer section 27, so that the RGB color signals in which the color temperature is controlled in accordance with the environmental temperature are displayed on the screen. FIG. 6 is a graph illustrating the color temperature variation characteristic of the displayed picture with respect to the environmental temperature effected by the present device.

Figure 7A:
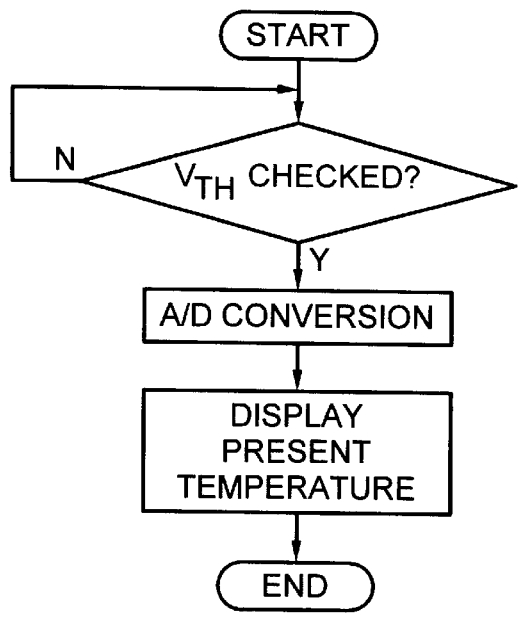
FIG. 7A is a flow chart explaining the display method of the current environmental temperature according to the present invention.
Figure 7B:
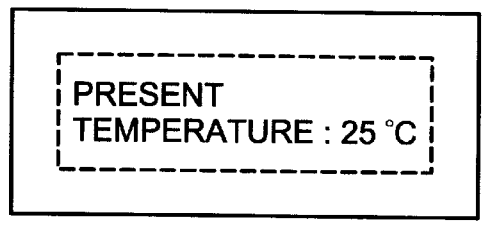
FIG. 7B is a view illustrating the display state of the current environmental temperature according to the present invention.

Meanwhile, as shown in FIG. 7A, the microprocessor 22 converts the voltage $V_{TH}$, which corresponds to the environmental temperature and is inputted through its A/D conversion terminal AD, into a digital signal, and displays the current environmental temperature on the screen by an onscreen display (OSD). FIG. 7B illustrates the display state of the present environmental temperature according to the present invention.

Accordingly, the viewer can recognize the current environmental temperature of the appliance as a numerical value by the OSD on the screen whenever the viewer wishes to do so.

Figure 8:
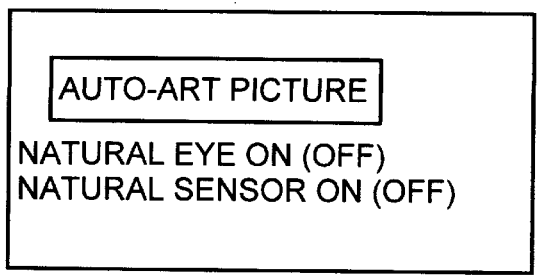
FIG. 8 is a view illustrating the display state of control operation according to the present invention.

According to the present invention, either or both of the picture control function whereby the picture is automatically controlled in accordance with the environmental brightness and color of the appliance (hereinafter referred to as "natural eye"), and the color temperature control function whereby the color temperature of the picture is automatically controlled in accordance with the environmental temperature (hereinafter referred to as "natural sensor") can be selectively performed by a separate function selecting means. FIG. 8 illustrates the OSD-display state of such picture and/or color temperature control functions being performed.

In other words, according to the present invention, the natural eye, the natural sensor, or both the natural eye and natural sensor can be selectively performed by the selection of the viewer.

As described above, according to the present invention, the color temperature of the displayed picture is automatically controlled in accordance with the environmental temperature of the video appliance so that a cool feeling is given from the picture when the environmental temperature is high, while a warm feeling is given from the picture when the environmental temperature is low, thereby providing the optimum picture to the viewer eye's sensation.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic color temperature control device for a video appliance, comprising:

a chromaticity sensing section to sense environmental brightness and color of the appliance;

a temperature sensing section to sense an ambient temperature of an environment in which the appliance is located;

a processing section to recognize the environmental brightness, environmental color, and ambient temperature in accordance with sensed signals outputted from the chromaticity sensing section and the temperature sensing section, and to output control signals for controlling a picture state of the appliance in response to the recognized environmental brightness, environmental color, and ambient temperature; and a video processor to control contrast, brightness, and color of a displayed picture in accordance with the control signals outputted from the processing section.

2. The automatic color temperature control device as claimed in claim 1, wherein the processing section controls the video processor so that the video processor lowers and heightens a color temperature of the displayed picture when the ambient temperature sensed by the temperature sensing section is high and low, respectively.

3. The automatic color temperature control device as claimed in claim 1, wherein the processing section converts the sensed temperature signal inputted from the temperature sensing section into a digital signal, and controls the video processor so that the corresponding sensed temperature is displayed on a screen of the appliance by an on-screen display.

4. The automatic color temperature control device as claimed in claim 1, further comprising a selector to select either or both of a picture control function performed in accordance with the environmental brightness and color of the appliance sensed by the chromaticity sensing section and a color temperature control function performed in accordance with the ambient temperature of the appliance sensed by the temperature sensing section.

5. The automatic color temperature control device as claimed in claim 4, wherein the control function, when selected, is displayed by an on-screen display on a screen of the appliance.

6. The automatic color temperature control device, for a video appliance, comprising:

a temperature sensor operable to sense an ambient temperature of an environment in which the video appliance is located; and a processing section, having an input connected to the sensor, to output a control signal to control a picture displayed by the video appliance, the processing section being operable to generate a first signal indicative of higher blue level in the picture when the sensed ambient temperature increases and a second signal indicative of higher red level in the picture when the sensed ambient temperature decreases.

7. The automatic color temperature control device as claimed in claim 1, wherein said temperature sensing section directly senses an air temperature of said environment in which said appliance is located.

8. The automatic color temperature control device as claimed in claim 7, wherein said temperature sensing section includes a thermistor to directly sense said air temperature.

9. The automatic color temperature control device as claimed in claim 6, wherein said temperature sensor directly senses an air temperature of said environment in which said appliance is located.

10. The automatic color temperature control device as claimed in claim 9, wherein said temperature sensor includes a thermistor to directly sense said air temperature.

* * * * *